US012542976B2

(12) United States Patent
Fujii

(10) Patent No.: US 12,542,976 B2
(45) Date of Patent: Feb. 3, 2026

(54) CONTROL DEVICE, IMAGING APPARATUS, CONTROL METHOD, AND CONTROL PROGRAM

(71) Applicant: FUJIFILM Corporation, Tokyo (JP)

(72) Inventor: Masato Fujii, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 376 days.

(21) Appl. No.: 18/061,887

(22) Filed: Dec. 5, 2022

(65) Prior Publication Data

US 2023/0209209 A1  Jun. 29, 2023

(30) Foreign Application Priority Data

Dec. 24, 2021  (JP) .................. 2021-210562

(51) Int. Cl.
| | |
|---|---|
| *H04N 23/743* | (2023.01) |
| *H04N 23/72* | (2023.01) |
| *H04N 23/73* | (2023.01) |
| *H04N 23/75* | (2023.01) |

(52) U.S. Cl.
CPC ........... *H04N 23/743* (2023.01); *H04N 23/72* (2023.01); *H04N 23/73* (2023.01); *H04N 23/75* (2023.01)

(58) Field of Classification Search
CPC ...... H04N 23/743; H04N 23/72; H04N 23/73; H04N 23/75; H04N 23/71
See application file for complete search history.

(56) References Cited

U.S. PATENT DOCUMENTS

| | | |
|---|---|---|
| 2010/0066897 A1 | 3/2010 | Miyanari |
| 2010/0231782 A1 | 9/2010 | Okamoto et al. |
| 2010/0232775 A1 | 9/2010 | Okamoto et al. |
| 2010/0232779 A1 | 9/2010 | Okamoto et al. |
| 2012/0127591 A1 | 5/2012 | Okamoto et al. |
| 2016/0105595 A1* | 4/2016 | Huang ................... H04N 23/75 348/363 |

FOREIGN PATENT DOCUMENTS

| | | |
|---|---|---|
| JP | 2010-074313 A | 4/2010 |
| JP | 2010-273325 A | 12/2010 |
| JP | 2015-185907 A | 10/2015 |
| JP | 2016-184874 A | 10/2016 |

OTHER PUBLICATIONS

"Notice of Reasons for Refusal" Office Action issued in JP 2021-210562; mailed by the Japanese Patent Office on May 27, 2025.

* cited by examiner

*Primary Examiner* — Sinh Tran
*Assistant Examiner* — Angel L Garces-Rivera
(74) *Attorney, Agent, or Firm* — Studebaker Brackett PLLC

(57) ABSTRACT

A control device of an imaging apparatus that images a subject through a stop, includes: a processor, and the processor is configured to: derive a first exposure value based on captured first image data; drive the stop based on the first exposure value; derive a second exposure value based on second image data captured during the driving of the stop based on the first exposure value; and change, during the driving of the stop based on the first exposure value, the driving of the stop to the driving of the stop based on the second exposure value.

24 Claims, 9 Drawing Sheets

CONTROL DEVICE, IMAGING APPARATUS, CONTROL METHOD, AND CONTROL PROGRAM

CROSS-REFERENCE TO RELATED APPLICATIONS

The present application claims priority under 35 U.S.C. § 119 to Japanese Patent Application No. 2021-210562, filed on Dec. 24, 2021. The above application is hereby expressly incorporated by reference, in its entirety, into the present application.

BACKGROUND OF THE INVENTION

1. Field of the Invention

The present invention relates to a control device, an imaging apparatus, a control method, and a computer readable medium storing a control program.

2. Description of the Related Art

JP2015-185907A discloses an image display control device comprising an imaging element drivable at a first frame rate that is a relatively low speed and at a second frame rate that is a relatively high speed, an image signal output unit that receives an image signal from the imaging element at the first or second frame rate and outputs the image signal to a monitor, and a stop for adjusting an exposure amount of the imaging element by changing an opening degree, in which when a request signal for changing the opening degree of the stop is output, the imaging element is changed from driving at the first frame rate to driving at the second frame rate, and the image signal output unit, while the opening degree of the stop is being changed, outputs the image signal acquired by the imaging element before the stop starts moving to the monitor.

JP2010-074313A discloses an imaging apparatus including a drive unit that drives a stop mechanism for adjusting a light quantity incident on an imaging element, an imaging unit that continuously reads out and outputs a frame image signal from the imaging element at a predetermined interval, a brightness detection unit that detects a brightness component of the frame image signal output from the imaging unit, a control unit that controls the drive unit to perform adjustment by the stop mechanism in accordance with a change between the brightness component detected by the brightness detection unit from the frame image signal and the brightness component detected by the brightness detection unit from the frame image signal immediately previous to the frame image signal, and a correction unit that corrects the brightness component of the frame image signal including a drive period in which the drive unit drives the stop mechanism, using the brightness component detected from the immediately previous frame image signal and the brightness component detected by the brightness detection unit from the frame image signal immediately subsequent to the start of the driving of the stop mechanism by the drive unit such that a difference between the brightness component and the brightness component detected from the immediately previous frame image is decreased.

JP2016-184874A discloses an imaging apparatus including an imaging element that generates a pixel signal by imaging subject light which has passed through an imaging optical system, a stop for restricting luminous flux which has passed through the imaging optical system, an amplification unit that amplifies the pixel signal generated by the imaging element with a predetermined amplification ratio, and a control unit that adjusts an exposure amount of image data based on the pixel signal generated by the imaging element by changing an opening of the stop and the amplification ratio of the amplification unit, in which after the exposure amount is adjusted by driving the stop to change the opening, the control unit adjusts the exposure amount by changing the amplification ratio of the amplification unit based on the change in the opening of the stop.

SUMMARY OF THE INVENTION

A control device according to one embodiment of the disclosed technology is a control device of an imaging apparatus that images a subject through a stop, the control device comprising a processor, in which the processor is configured to derive a first exposure value based on captured first image data, drive the stop based on the first exposure value, derive a second exposure value based on second image data captured during the driving of the stop based on the first exposure value, and change the driving of the stop to the driving of the stop based on the second exposure value during the driving of the stop based on the first exposure value.

An imaging apparatus according to another embodiment of the disclosed technology comprises the control device.

A control method according to still another embodiment of the disclosed technology is a control method of an imaging apparatus that images a subject through a stop, the control method comprising deriving a first exposure value based on captured first image data, driving the stop based on the first exposure value, deriving a second exposure value based on second image data captured during the driving of the stop based on the first exposure value, and changing the driving of the stop to the driving of the stop based on the second exposure value during the driving of the stop based on the first exposure value.

A control program stored in a computer readable medium according to still another embodiment of the disclosed technology is a control program of an imaging apparatus that images a subject through a stop, the control program causing a processor to execute deriving a first exposure value based on captured first image data, driving the stop based on the first exposure value, deriving a second exposure value based on second image data captured during the driving of the stop based on the first exposure value, and changing the driving of the stop to the driving of the stop based on the second exposure value during the driving of the stop based on the first exposure value.

DESCRIPTION OF THE PREFERRED EMBODIMENTS

Figure 1:
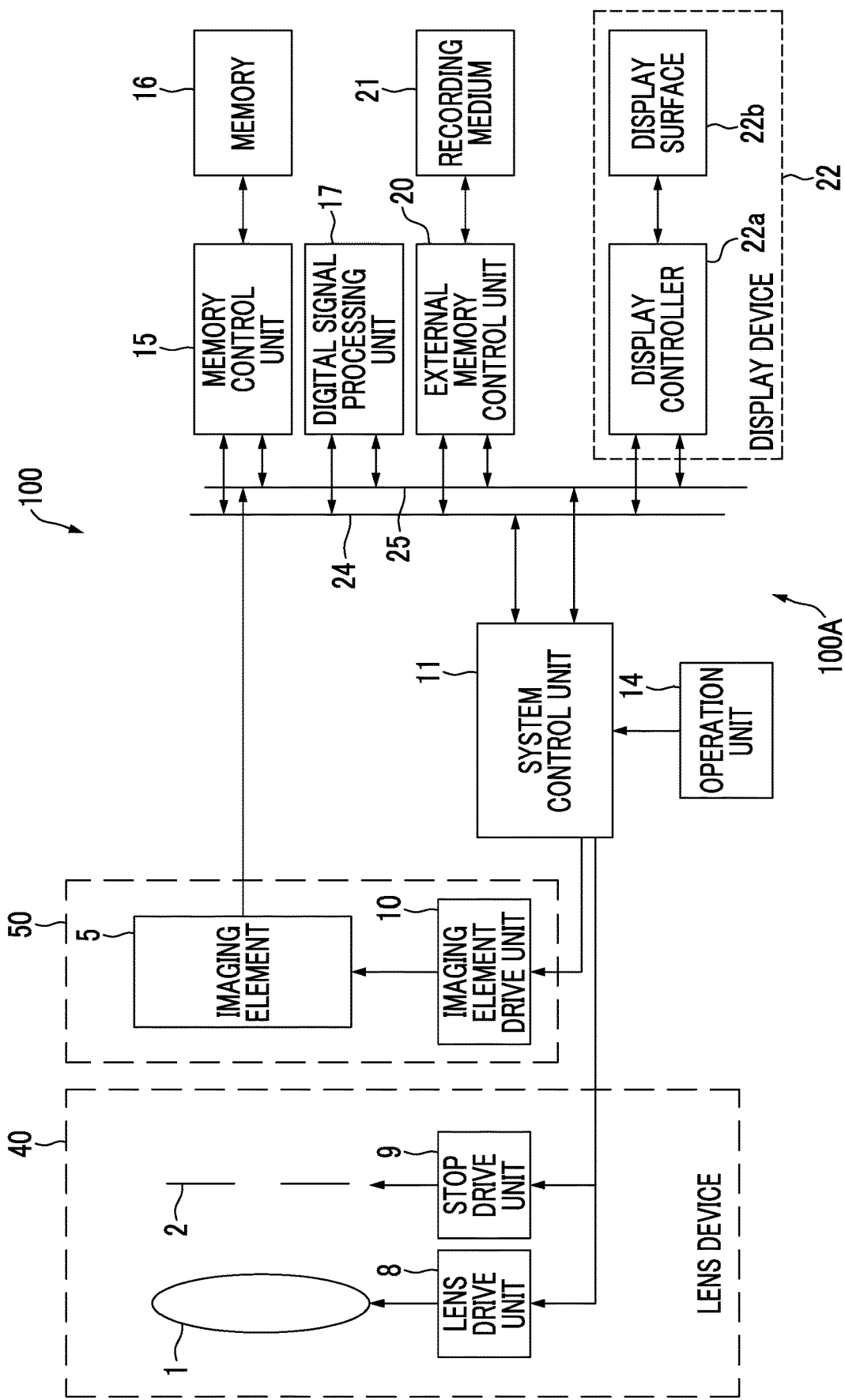
FIG. 1 is a diagram illustrating a schematic configuration of a digital camera 100 that is one embodiment of an imaging apparatus according to the present invention.

FIG. 1 is a diagram illustrating a schematic configuration of a digital camera 100 that is one embodiment of an imaging apparatus according to the present invention.

The digital camera 100 illustrated in FIG. 1 comprises a lens device 40 including an imaging lens 1, a stop 2, a lens drive unit 8 that drives the imaging lens 1, and a stop drive unit 9 that drives the stop 2; and a main body unit 100A. The main body unit 100A comprises an imaging unit 50, a system control unit 11, an operation unit 14, a display device 22, a memory 16 including a random access memory (RAM), a read only memory (ROM), and the like, a memory control unit 15 that controls data recording in the memory 16 and data readout from the memory 16, a digital signal processing unit 17, and an external memory control unit 20 that controls data recording on a recording medium 21 and data readout from the recording medium 21.

The lens device 40 may be attachable and detachable with respect to the main body unit 100A or may be integrated with the main body unit 100A. The imaging lens 1 includes a focus lens or the like that can be moved in an optical axis direction.

The lens drive unit 8 of the lens device 40 changes a position of a principal point of the focus lens by driving the focus lens included in the imaging lens 1 based on a lens drive signal transmitted from the system control unit 11. The stop drive unit 9 of the lens device 40 changes an opening amount (F number) of the stop 2 by driving the stop 2 based on a driving control signal transmitted from the system control unit 11. Hereinafter, a position of an opening end of the stop 2 in a radius direction of an opening of the stop 2 will be referred to as a stop position.

The imaging unit 50 comprises an imaging element 5 that images a subject through an imaging optical system including the imaging lens 1 and the stop 2, and an imaging element drive unit 10 that drives the imaging element 5.

The imaging element 5 includes a light-receiving surface on which a plurality of pixels are two-dimensionally arranged, converts a subject image formed on the light-receiving surface by the imaging optical system into pixel signals by the plurality of pixels, and outputs the pixel signals. For example, a complementary metal-oxide semiconductor (CMOS) image sensor is used as the imaging element 5. However, the present invention is not limited thereto.

The system control unit 11 that manages and controls the entire electric control system of the digital camera 100 drives the imaging element 5 through the imaging element drive unit 10 and outputs the subject image captured through the imaging optical system of the lens device 40 as an image signal.

The imaging element drive unit 10 drives the imaging element 5 by generating a drive signal based on an instruction from the system control unit 11 and supplying the drive signal to the imaging element 5.

A command signal from a user is input into the system control unit 11 through the operation unit 14. The operation unit 14 includes a touch panel integrated with a display surface 22b and various buttons and the like.

The system control unit 11 manages and controls the entire digital camera 100. A hardware structure of the system control unit 11 corresponds to various processors that perform processing by executing programs including a control program. The programs executed by the system control unit 11 are stored in the ROM of the memory 16.

The various processors include a central processing unit (CPU) that is a general-purpose processor performing various types of processing by executing a program, a programmable logic device (PLD) that is a processor of which a circuit configuration can be changed after manufacturing like a field programmable gate array (FPGA), or a dedicated electric circuit or the like that is a processor having a circuit configuration dedicatedly designed to execute a specific type of processing like an application specific integrated circuit (ASIC). More specifically, a structure of the various processors is an electric circuit in which circuit elements such as semiconductor elements are combined.

The system control unit 11 may be configured with one of the various processors or may be configured with a combination of two or more processors of the same type or different types (for example, a combination of a plurality of FPGAs or a combination of a CPU and an FPGA).

The display device 22 comprises the display surface 22b configured with an organic electroluminescence (EL) panel, a liquid crystal panel, or the like and a display controller 22a that controls display on the display surface 22b.

The memory control unit 15, the digital signal processing unit 17, the external memory control unit 20, and the display controller 22a are connected to each other through a control bus 24 and a data bus 25 and are controlled by instructions from the system control unit 11.

Next, an operation of the digital camera 100 at a time of continuously performing imaging such as imaging for live view image display or imaging for motion picture recording by the imaging element 5 (at a time of continuous imaging at a specific frame rate) will be described. Hereinafter, a period in which processing for acquiring one piece of image data (frame) at the time of the continuous imaging will be referred to as a frame period. In a case where the frame period is started, the subject is imaged by the imaging element 5, and the image data is generated.

At the time of the continuous imaging, the system control unit 11 performs exposure calculation of performing light measurement processing based on the image data obtained by imaging of the imaging element 5 and deriving an appropriate exposure value for the subject in imaging based on a result of the light measurement processing. In a case where the appropriate exposure value is derived by the exposure calculation, the system control unit 11 decides an imaging condition for obtaining the appropriate exposure value. The imaging condition includes the F number of the stop 2, a shutter speed (in other words, an exposure time) of the imaging element 5, and imaging sensitivity (International Organization for Standardization (ISO) sensitivity) of the imaging element 5.

Figure 2:
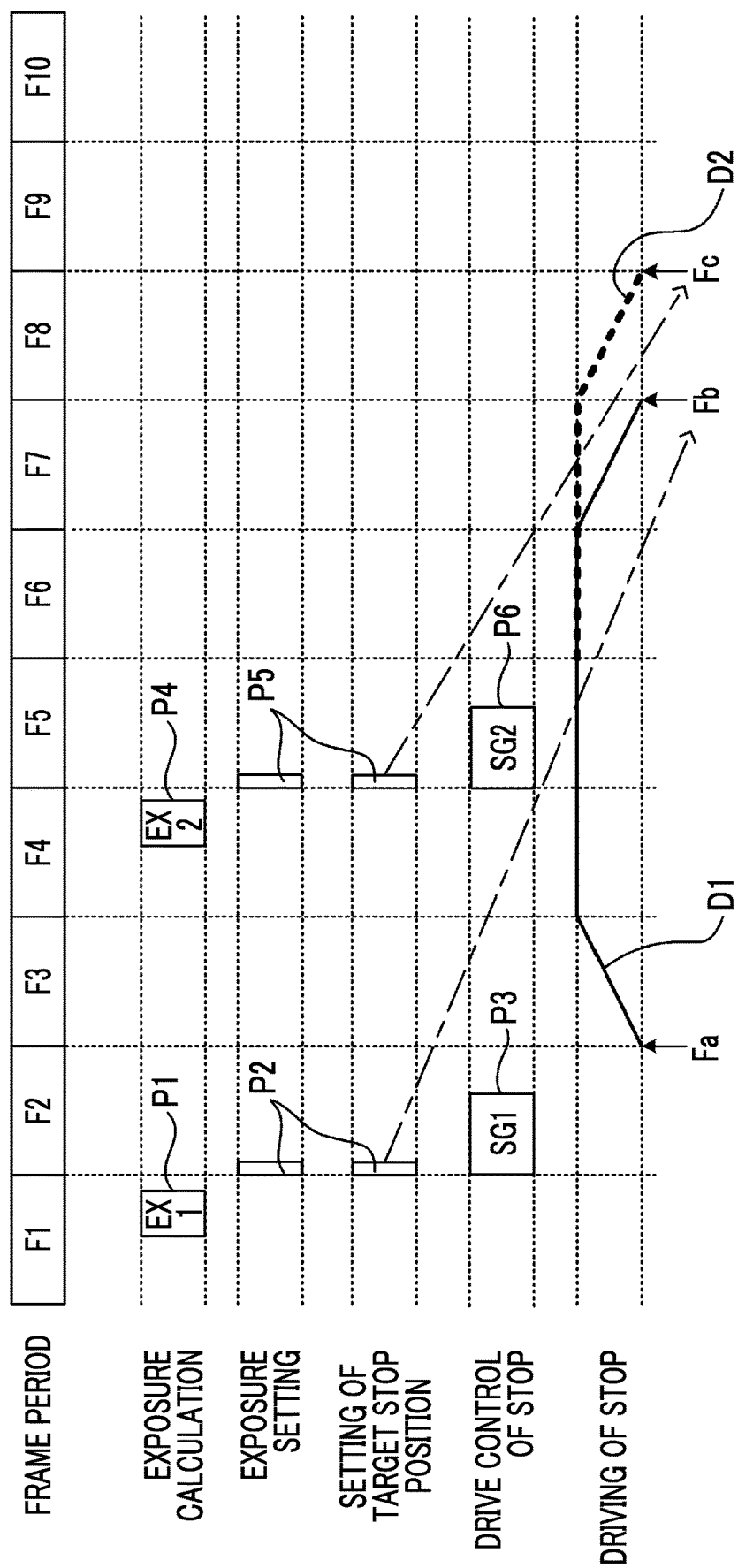
FIG. 2 is a timing chart for describing an example of an operation of the digital camera 100 at a time of continuous imaging.

FIG. 2 is a timing chart for describing an example of the operation of the digital camera 100 at the time of the continuous imaging. FIG. 2 illustrates an example in which imaging is continuously performed 10 times over frame periods F1 to F10.

Here, "drive control of stop" illustrated in FIG. 2 indicates a timing at which processing of generating the driving control signal for driving the stop position to a stop position as a target (hereinafter, a target stop position) and transmitting the driving control signal to the stop drive unit 9 by the system control unit 11 is performed. The driving control signal includes a first driving control signal and a second driving control signal.

The first driving control signal is configured with information about a stop drive period for designating how many frame periods the driving of the stop 2 is to continue, information for providing an instruction to perform accelerated driving in the first frame period in the stop drive period, information for providing an instruction to perform decelerated driving in the last frame period in the stop drive period, and information for providing an instruction to perform constant speed driving in each frame period between the first frame period and the last frame period in the stop drive period.

The accelerated driving refers to the driving of the stop 2 while gradually increasing (accelerating) a drive speed of the stop 2 from zero to a predetermined value. The constant speed driving refers to the driving of the stop 2 while setting the drive speed of the stop 2 to a constant value (the predetermined value). The decelerated driving refers to the driving of the stop 2 while gradually decreasing (decelerating) the drive speed of the stop 2 from the predetermined value to zero.

The second driving control signal is configured with the information about the stop drive period for designating how many frame periods the driving of the stop 2 is to continue, information for providing an instruction to perform the decelerated driving in the last frame period in the stop drive period, and information for providing an instruction to perform the constant speed driving in each frame period except the last frame period in the stop drive period.

The system control unit 11 performs a first drive control of causing the stop drive unit 9 to drive the stop 2 by generating the first driving control signal and transmitting the first driving control signal to the stop drive unit 9. The system control unit 11 performs a second drive control of causing the stop drive unit 9 to drive the stop 2 by generating the second driving control signal and transmitting the second driving control signal to the stop drive unit 9.

In addition, "driving of stop" illustrated in FIG. 2 indicates a state of the driving of the stop 2 performed by the stop drive unit 9. A vertical axis denotes the drive speed (speed of change in the opening amount) of the stop 2.

In a case where the image data obtained by imaging in the frame period F1 is acquired, the system control unit 11 performs the light measurement processing based on the image data and derives an appropriate exposure value EX1 based on the result of the light measurement processing (processing P1). Next, the system control unit 11 performs exposure setting (setting of the shutter speed and the imaging sensitivity) for obtaining the appropriate exposure value EX1 and setting of a target F number (setting of a target stop position Fb) for obtaining the appropriate exposure value EX1 (processing P2). For the exposure setting, setting is reflected from the frame period F2 subsequent to the frame period F1.

Next, the system control unit 11 generates a first driving control signal SG1 for driving the stop position to the target stop position Fb based on the target stop position Fb set in the processing P2 and transmits the first driving control signal SG1 to the stop drive unit 9 (processing P3). The processing P3 is performed in the frame period F2, and the driving of the stop 2 based on the first driving control signal SG1 is started from the frame period F3.

In the example in FIG. 2, the first driving control signal SG1 is used for driving the stop 2 from a current stop position Fa to the target stop position Fb using five frame periods. The stop drive unit 9 that has received the first driving control signal SG1 starts first driving D1 (a trapezoidal drive waveform in FIG. 2) based on the first driving control signal SG1 from the frame period F3. A content of the first driving D1 includes the accelerated driving of the stop 2 in the first frame period (frame period F3) in the drive period, the decelerated driving of the stop 2 in the last frame period (frame period F7) in the drive period, and the constant speed driving of the stop 2 in intermediate frame periods (frame periods F4 to F6) in the drive period.

Next, the system control unit 11 acquires the image data obtained by imaging in the frame period (in the example in FIG. 2, the frame period F4) before a transition to the frame period F7 in which the decelerated driving is started, among the periods (frame periods F3 to F7) in which the first driving D1 is performed, performs the light measurement processing based on the image data, and derives an appropriate exposure value EX2 based on the result of the light measurement processing (processing P4).

Next, the system control unit 11 performs the exposure setting (setting of the shutter speed and the imaging sensitivity) for obtaining the appropriate exposure value EX2 and the setting of a new target F number (setting of a target stop position Fc) for obtaining the appropriate exposure value EX2 (processing P5). For the exposure setting, setting is reflected from the frame period F5 subsequent to the frame period F4. Here, an assumption is made that the target stop position Fc is not present between the stop position Fa and the target stop position Fb and is present on an opposite side of the target stop position Fb from a stop position Fa side. That is, an assumption is made that a drive direction of the stop 2 in driving the stop 2 from the stop position Fa to the target stop position Fb is the same as the drive direction of the stop 2 in driving the stop 2 from the stop position Fa to the target stop position Fc.

Next, the system control unit 11 generates a second driving control signal SG2 for driving the stop position to the target stop position Fc based on the target stop position Fc set in the processing P5 and transmits the second driving control signal SG2 to the stop drive unit 9 (processing P6). The processing P6 is performed in the frame period F5, and the driving of the stop 2 based on the second driving control signal SG2 is started from the frame period F6.

In the example in FIG. 2, the second driving control signal SG2 is used for driving the stop 2 to the target stop position Fc using three frame periods. The stop drive unit 9 that has received the second driving control signal SG2 starts second driving D2 (a broken line waveform in FIG. 2) based on the second driving control signal SG2 from the frame period F6. A content of the second driving D2 includes the decelerated driving of the stop 2 in the last frame period (frame period F8) in the drive period and the constant speed driving of the stop 2 in each of the other frame periods (the frame period F6 and the frame period F7).

During the first driving D1 based on the appropriate exposure value EX1, the system control unit 11 changes the driving of the stop 2 from the first driving D1 to the second driving D2. Generally, once the driving of the stop 2 is stopped, the driving cannot be immediately resumed because of excitation or the like. For example, an assumption is made that one frame period is necessary from the stoppage of the driving to the resumption of the driving of the stop 2. In the related art, for example, an appropriate exposure value is newly derived in the frame period F8 after the first driving D1 is completed, and the stop 2 is driven again in the frame period F10 based on the appropriate exposure value. In this technology of the related art, the driving and the stoppage of the stop 2 are repeated because of a change in brightness of the subject, and brightness of a continuously captured image changes. On the other hand, according to the control illustrated in FIG. 2, even in a case where the brightness of the subject has changed during the first driving D1, the stop 2 can be continuously driven to the target stop position corresponding to the brightness after change without stopping the driving of the stop 2. Accordingly, quality of the live view image or the recorded motion picture can be improved by suppressing the change in the brightness of the continuously captured image.

Particularly, as illustrated in FIG. 2, by switching the driving of the stop 2 to the second driving D2 in the frame period F6 in which the constant speed driving is scheduled to be performed in the first driving D1, the switching from the first driving D1 to the second driving D2 can be seamlessly and stably performed. For example, in a case of updating the target stop position based on the image data obtained by imaging in the frame period F5, it is necessary to switch the driving of the stop 2 to the second driving D2 in the frame period F7 in which the decelerated driving is started in the first driving D1. In this case, in the example in FIG. 2, there is no change in drive content between frame periods before and after the change from the first driving D1 to the second driving D2. Thus, the switching from the first driving D1 to the second driving D2 can be seamlessly and stably performed.

In the example in FIG. 2, while the appropriate exposure value is derived in the frame period F4, the appropriate exposure value may be derived in the frame period F3. In this case, the second driving control signal SG2 is generated in the frame period F4, and the second driving D2 based on the second driving control signal SG2 is started in the frame period F5. Even in this case, the switching from the first driving D1 to the second driving D2 can also be seamlessly and stably performed.

Figure 3:
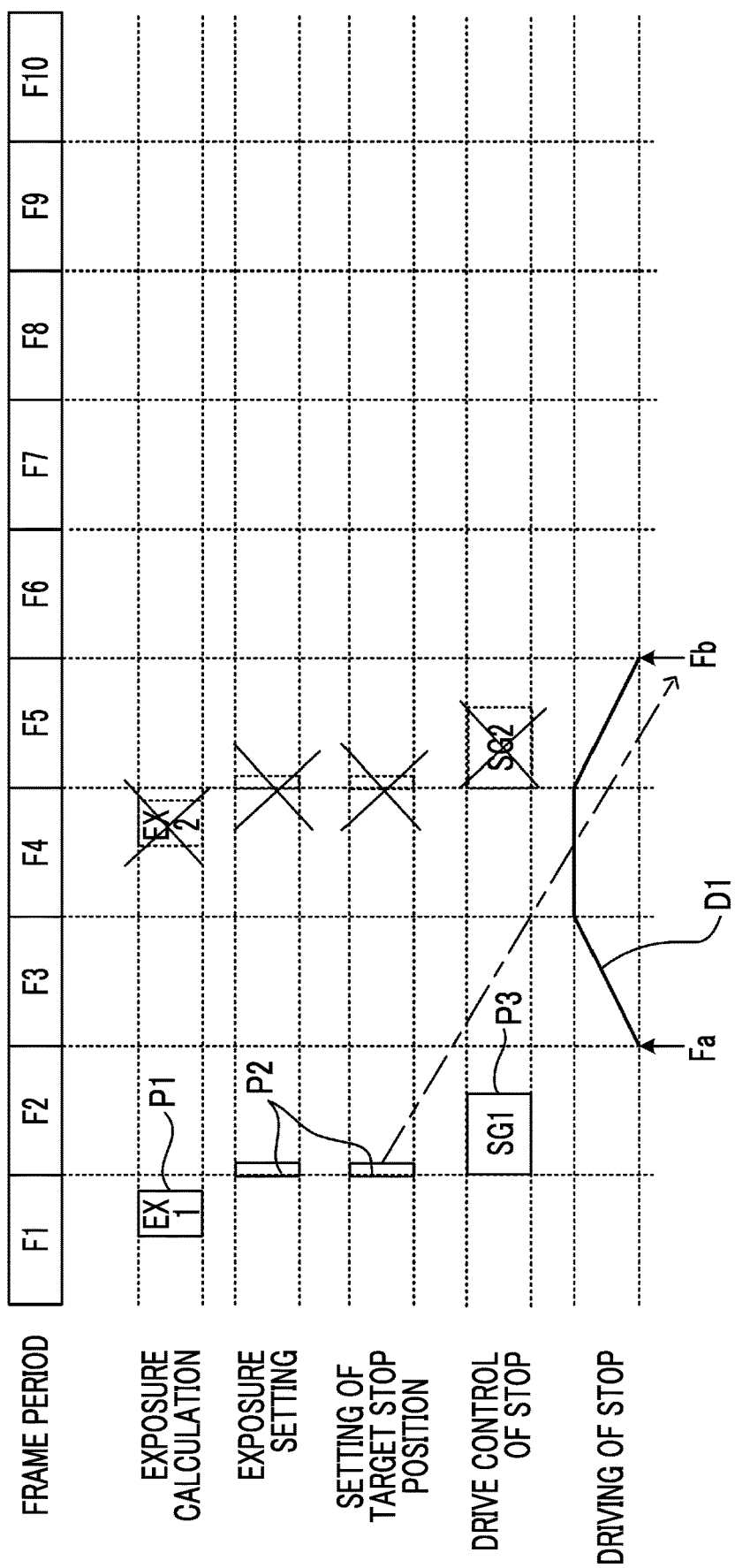
FIG. 3 is a timing chart for describing an example of the operation of the digital camera 100 at the time of the continuous imaging.

It is preferable that the second driving D2 is started in the frame period in which the constant speed driving is scheduled to be performed in the first driving D1. In the present embodiment, one frame period is necessary from the setting of the target stop position to the start of the driving of the stop 2 toward the target stop position. Accordingly, as illustrated in FIG. 3, in a case where the number of periods in which the first driving D1 is performed is three frame periods, it is preferable that the change to the second driving D2 during the first driving D1 is not performed (the exposure calculation is not executed).

In other words, in a case where a time (a length of a period except the last frame period) until a transition to the decelerated driving in the period in which the first driving D1 is performed is less than a threshold value (=time corresponding to three frame periods), it is preferable that the change to the second driving D2 during the first driving D1 is not performed. Alternatively, in a case where a time (a length of a period in which the constant speed driving is performed) until a transition to the decelerated driving after a transition to the constant speed driving in the period in which the first driving D1 is performed is less than a threshold value (=a time corresponding to two frame periods), it is preferable that the change to the second driving D2 during the first driving D1 is not performed.

Even in a case where the period in which the first driving D1 is performed is greater than or equal to four frame periods, it is preferable that the first driving D1 is continued to complete the first driving D1 without performing the change to the second driving D2 during the first driving D1 in a case where the drive direction of the stop 2 by the second driving D2 based on the appropriate exposure value EX2 derived in the period is opposite to the drive direction of the stop 2 by the first driving D1. By doing so, the stop 2 can be stably driven by preventing a sudden reversal or a sudden stoppage of the stop 2 caused by the change from the first driving D1 to the second driving D2.

Figure 4:
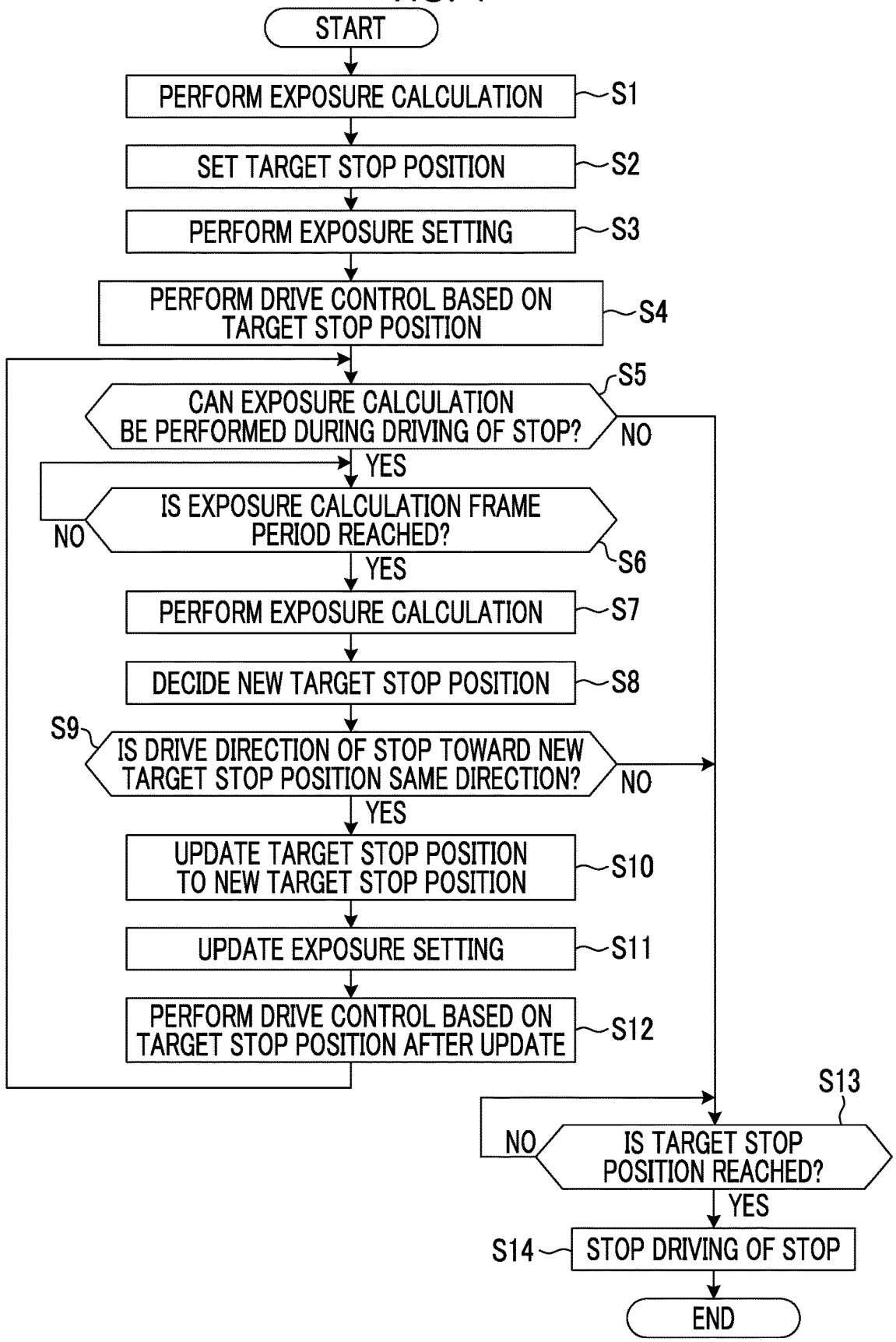
FIG. 4 is a flowchart for describing a preferable operation (Part 1) of a system control unit 11 at the time of the continuous imaging.

FIG. 4 is a flowchart for describing a preferable operation (Part 1) of the system control unit 11 at the time of the continuous imaging.

In a case where the continuous imaging is started, for example, the system control unit 11 derives the appropriate exposure value by performing the exposure calculation based on the image data obtained by imaging in the first frame period (step S1), sets the target stop position based on the appropriate exposure value (step S2), and performs the exposure setting (step S3).

The system control unit 11 performs a drive control of generating the first driving control signal for driving the stop position to the target stop position based on the target stop position set in step S2 and transmitting the first driving control signal to the stop drive unit 9 (step S4). By this drive control, the driving (first driving) of the stop 2 from the current stop position to the target stop position is started.

The system control unit 11 determines whether or not the exposure calculation for updating the target stop position can be performed during the first driving (step S5). Specifically, in a case where the drive period of the stop 2 decided by the first driving control signal is greater than or equal to four frame periods, the system control unit 11 determines that the exposure calculation for updating the target stop position can be performed. In a case where the drive period of the stop 2 decided by the first driving control signal is less than four frame periods, the system control unit 11 determines that the exposure calculation for updating the target stop position cannot be performed.

In a case where a determination is made that the exposure calculation for updating the target stop position cannot be performed (step S5: NO), the system control unit 11 performs the processing in step S13. In step S13, the system control unit 11 determines whether or not the stop position has reached the target stop position and, in a case where the stop position has reached the target stop position (step S13: YES), stops the driving of the stop 2 (step S14).

In a case where a determination is made that the exposure calculation for updating the target stop position can be performed (step S5: YES), the system control unit 11 determines whether or not an exposure calculation frame period (a frame period that is three frame periods before the last frame period in the drive period in which the first driving is performed) is reached (step S6).

In a case where the determination in step S6 results in YES, the system control unit 11 derives a new appropriate exposure value by performing the exposure calculation based on the image data obtained by imaging in the exposure calculation frame period (step S7) and decides a new target stop position based on the appropriate exposure value (step S8). Then, the system control unit 11 determines whether or not the drive direction of the stop 2 from the current stop position toward the new target stop position is the same as the drive direction of the stop 2 by the first driving being executed (step S9).

In a case where the determination in step S9 results in NO, the processing transitions to step S13. In a case where the determination in step S9 results in YES, the system control unit 11 updates the target stop position set at a current point in time to the new target stop position decided in step S8 (step S10). In addition, the system control unit 11 updates the exposure setting based on the new appropriate exposure value derived in step S7 (step S11).

The system control unit 11 performs a drive control of generating the second driving control signal for driving the stop position to the target stop position based on the target stop position after update in step S10 and transmitting the second driving control signal to the stop drive unit 9 (step S12). By this drive control, the first driving is changed to the second driving based on the second driving control signal. After step S12, the processing transitions to step S5.

According to the operation illustrated in FIG. 4, even in a case where the brightness of the subject continuously changes, the driving of the stop 2 is changed to the second driving during the first driving and is further changed to another second driving during the second driving. Thus, even in a scene in which the brightness of the subject continuously changes, quality of the captured image can be improved.

An operation unit (a so-called stop ring) for manually changing the opening amount of the stop 2 may be provided in the digital camera 100. A preferable operation at the time of the continuous imaging in a case where this operation unit is included in the digital camera 100 will be described with reference to FIG. 5.

Figure 5:
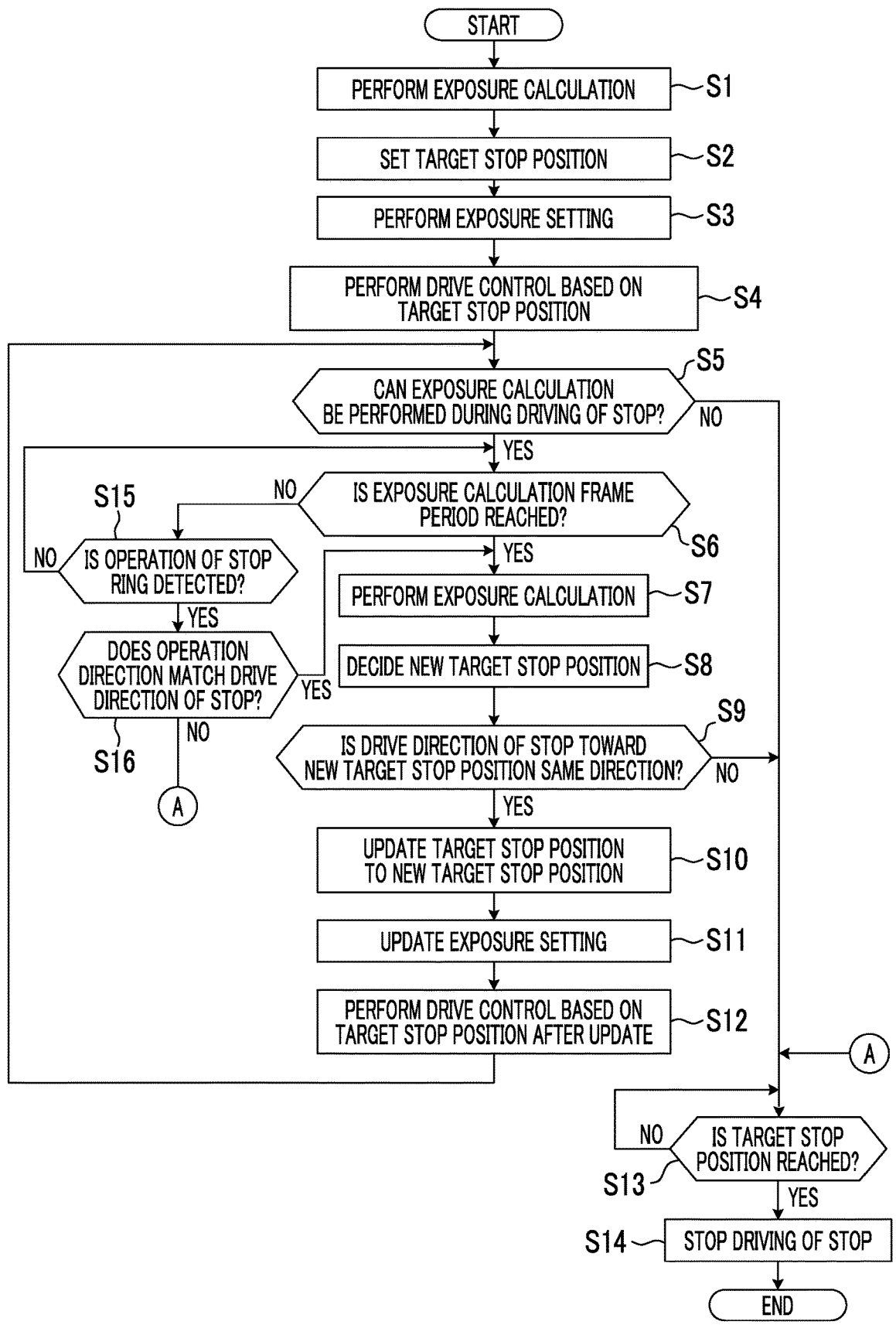
FIG. 5 is a flowchart for describing the preferable operation (Part 2) of the system control unit 11 at the time of the continuous imaging.

FIG. 5 is a flowchart for describing the preferable operation (Part 2) of the system control unit 11 at the time of the continuous imaging. The flowchart illustrated in FIG. 5 is the same as FIG. 4 except that step S15 and step S16 are added. In FIG. 5, the same processing as FIG. 4 will be designated by the same reference numerals as FIG. 4 and will not be described.

In a case where the determination in step S6 results in NO, the system control unit 11 determines whether or not an operation of the stop ring is performed (step S15). In a case where the operation of the stop ring is not detected, and a determination is made that the operation of the stop ring is not performed (step S15: NO), the system control unit 11 restores the processing to step S6.

In a case where the operation of the stop ring is detected, and a determination is made that the operation of the stop ring is performed (step S15: YES), the system control unit 11 determines whether or not an operation direction of the stop ring matches the current drive direction of the stop 2 by the stop drive unit 9 (step S16).

In a case where the operation direction of the stop ring is the same as the drive direction of the stop 2 by the stop drive unit 9 (step S16: YES), the system control unit 11 transitions the processing to step S7 without waiting for the reaching of the exposure calculation frame period. At this point, in step S7, the system control unit 11 performs the exposure calculation based on the image data obtained by imaging in the latest frame period (a frame period before the exposure calculation frame period). In a case where the operation direction of the stop ring is opposite to the drive direction of the stop 2 by the stop drive unit 9 (step S16: NO), the system control unit 11 transitions the processing to step S13.

In the operation illustrated in FIG. 5, in a case where an operation of changing the stop position of the stop 2 in the same direction as the drive direction of the stop 2 is performed by a user during the driving of the stop 2 by the stop drive unit 9, a new appropriate exposure value is immediately derived without waiting for the reaching of the exposure calculation frame period. Thus, the update to target stop position in which the operation of the user is considered can be performed, and the quality of the captured image can be improved.

Figure 6:
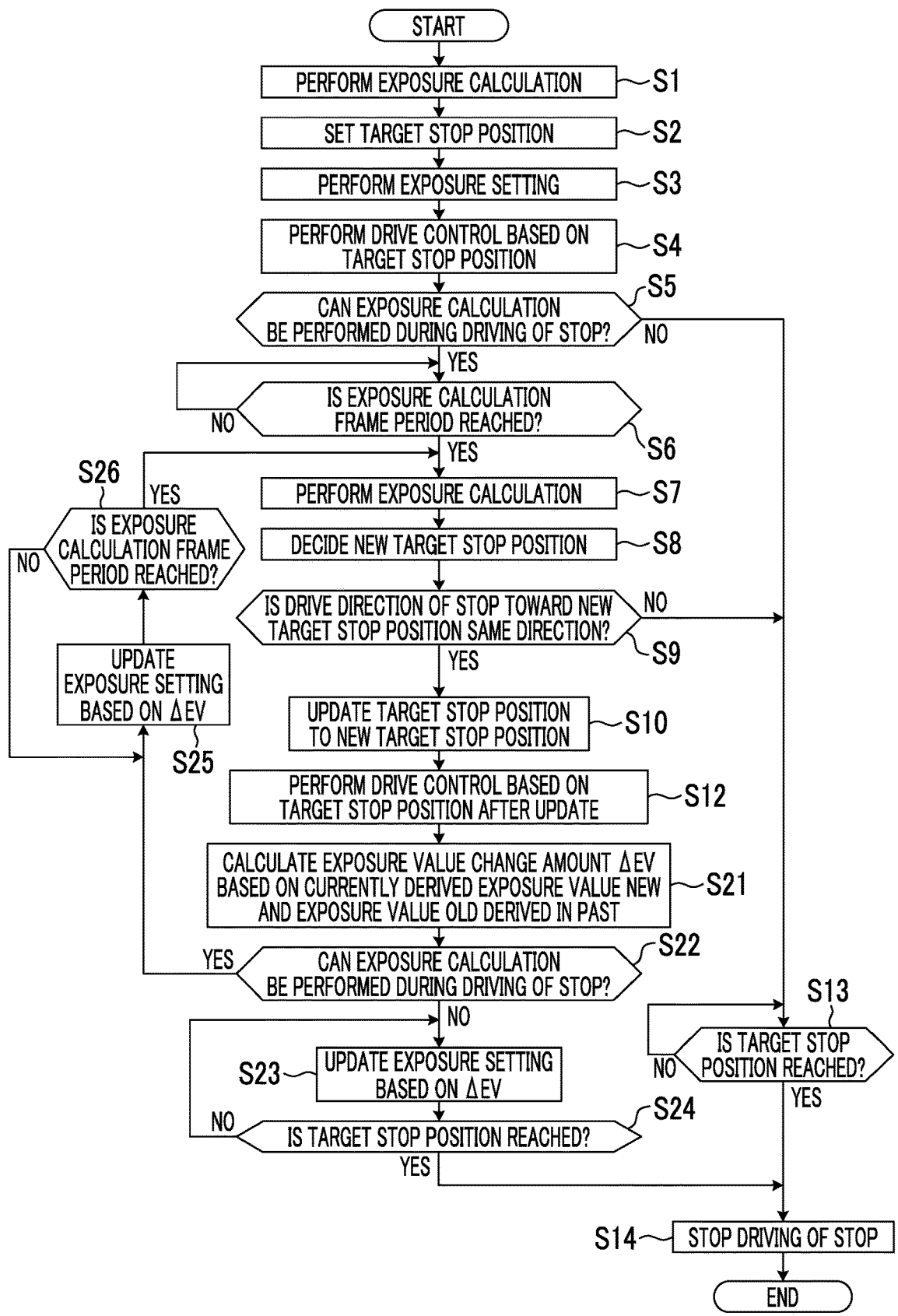
FIG. 6 is a timing chart for describing the preferable operation (Part 3) of the system control unit 11 at the time of the continuous imaging.

FIG. 6 is a timing chart for describing the preferable operation (Part 3) of the system control unit 11 at the time of the continuous imaging. In the timing chart illustrated in FIG. 2, the exposure setting (setting of the shutter speed and the imaging sensitivity) for obtaining the appropriate exposure value EX2 derived in the frame period F4 is maintained in the remaining drive period (frame periods F5 to F8) of the stop 2. On the other hand, in the timing chart illustrated in FIG. 6, the exposure setting (in other words, the set exposure value) in each frame period from the frame period F5 to the frame period F8 is gradually changed to a target state. Accordingly, the change in the brightness of the captured image is suppressed, and the quality of the captured image is improved.

Figure 7:
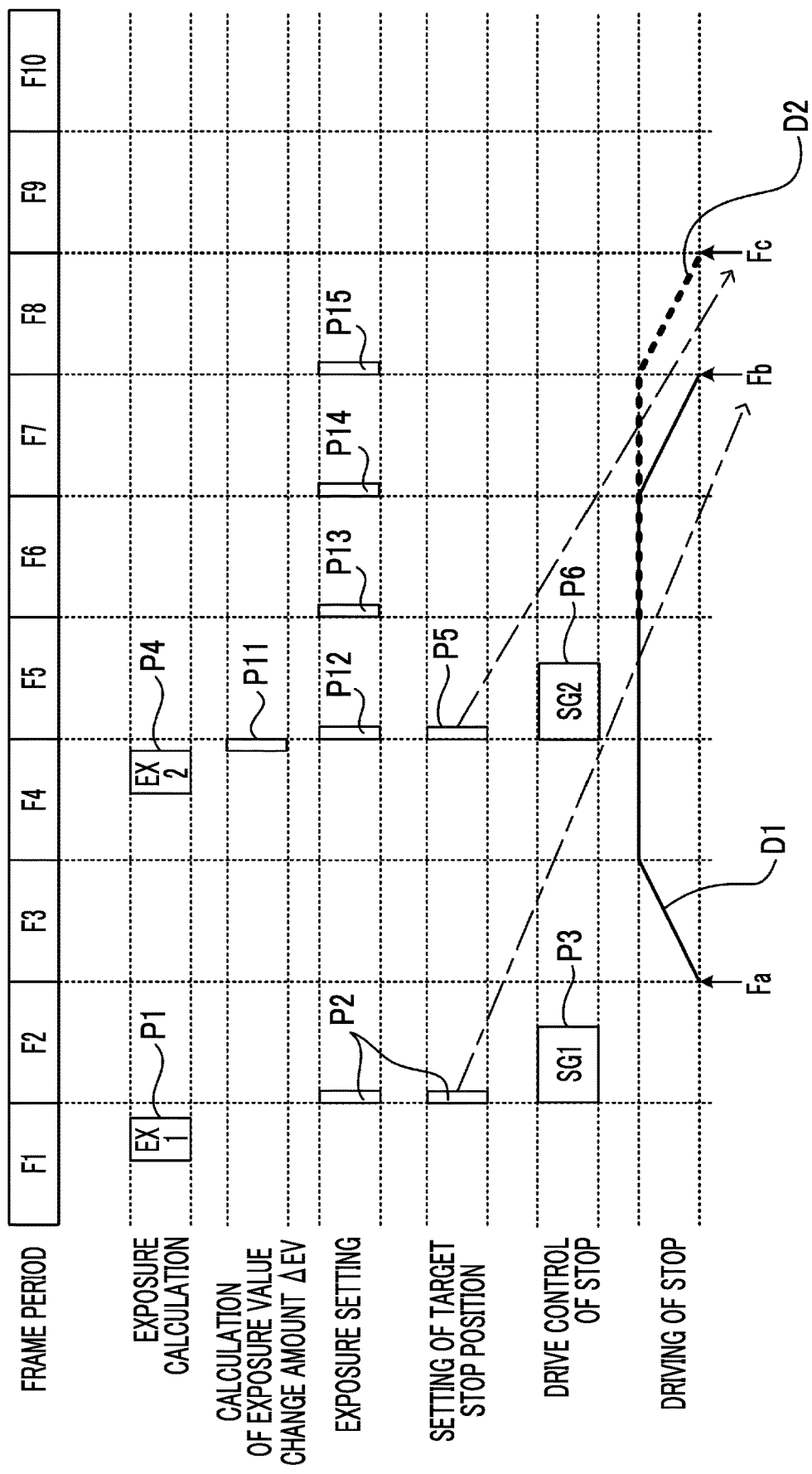
FIG. 7 is a timing chart for describing the operation of the flowchart illustrated in FIG. 6.

The flowchart illustrated in FIG. 6 is the same as FIG. 4 except that step S11 between step S10 and step S12 is deleted, and step S21 to step S26 are added. In FIG. 6, the same processing as FIG. 4 will be designated by the same reference numerals as FIG. 4 and will not be described. FIG. 7 is a timing chart for describing the operation of the flowchart illustrated in FIG. 6.

After step S12, based on the appropriate exposure value (referred to as an exposure value NEW) derived in step S7 and the past appropriate exposure value (referred to as an exposure value OLD) derived by the exposure calculation immediately before step S7, the system control unit 11 calculates an exposure value change amount $\Delta EV$ that is an amount of change of the exposure value per frame period in the remaining frame periods (in the example in FIG. 7, four frame periods of the frame periods F5 to F8) until the driving of the stop 2 extended based on the exposure value NEW is finished (step S21). Specifically, the system control unit 11 calculates a value obtained by dividing a subtraction value obtained by subtracting the exposure value OLD from the exposure value NEW by the number of the remaining frame periods, as the exposure value change amount $\Delta EV$. In the example in FIG. 7, the exposure value change amount $\Delta EV$ is calculated by a calculation of {(appropriate exposure value EX2 derived in frame period F4)−(appropriate exposure value EX1 derived in frame period F1)}/4 in processing P11.

After step S21, the system control unit 11 determines whether or not the exposure calculation for updating the target stop position can be performed (step S22). Specifically, in a case where the number of the remaining frame periods is greater than or equal to four frame periods, the system control unit 11 determines that the exposure calculation for updating the target stop position can be performed. In a case where the number of the remaining frame periods is less than four frame periods, the system control unit 11 determines that the exposure calculation for updating the target stop position cannot be performed. In the example in FIG. 7, since the processing in step S22 is performed in the frame period F5, the number of the remaining frame periods is three, and a determination is made that the exposure calculation for updating the target stop position cannot be performed.

In a case where the determination in step S22 results in NO, the system control unit 11 updates the exposure setting (setting of the shutter speed and the imaging sensitivity) based on the exposure value change amount $\Delta EV$ (step S23).

Specifically, the system control unit 11 sets the exposure value obtained by adding N times the exposure value change amount ΔFV to the exposure value OLD as the exposure value in the current frame period. The system control unit 11 decides the shutter speed and the imaging sensitivity necessary for obtaining the set exposure value in a case where an assumption is made that the stop position is present at the target stop position (that is, in a case where the F number is fixed at a target value), and sets the shutter speed and the imaging sensitivity of the current frame period based on the decided content. A value of N indicates the number of frame periods elapsed from the frame period in which the exposure value NEW is derived.

In the example in FIG. 7, the exposure value obtained by adding the exposure value change amount ΔEV to the appropriate exposure value EX1 is set in the frame period F5, and the exposure setting is updated in processing P12 based on the set exposure value and the target stop position Fc.

After step S23, the system control unit 11 determines whether or not the stop 2 has reached the target stop position (step S24). In a case where the stop has not reached the target position (step S24: NO), the system control unit 11 restores the processing to step S23. In a case where the stop has reached the target position (step S24: YES), the system control unit 11 transitions the processing to step S14.

In the example in FIG. 7, after the processing P12, the exposure setting is updated each time each frame period of the frame period F6 to the frame period F8 is started (processing P13 to P15).

In the processing P13, the exposure value obtained by adding a value of twice the exposure value change amount ΔEV to the appropriate exposure value EX1 is used as the set exposure value of the frame period F6, and the exposure setting of imaging in the frame period F6 is performed based on this set exposure value.

In the processing P14, the exposure value obtained by adding a value of three times the exposure value change amount ΔEV to the appropriate exposure value EX1 is used as the set exposure value of the frame period F7, and the exposure setting of imaging in the frame period F7 is performed based on this set exposure value.

In the processing P15, the exposure value obtained by adding a value of four times the exposure value change amount ΔEV to the appropriate exposure value EX1 is used as the set exposure value of the frame period F8, and the exposure setting of imaging in the frame period F8 is performed based on this set exposure value.

By updating the exposure setting for each frame period, the shutter speed and the imaging sensitivity set in the processing P15 in FIG. 7 are the same as the values set in the processing P5 illustrated in FIG. 2.

In a case where the determination in step S22 results in YES, the system control unit 11 performs the same processing as step S23 (step S25). After step S25, the system control unit 11 determines whether or not the exposure calculation frame period has reached (step S26). In a case where the determination in step S26 results in NO, the processing is restored to step S25. In a case where the determination in step S26 results in YES, the processing transitions to step S7.

According to the operation illustrated in FIG. 6, the exposure setting (set exposure value) in each frame period of the remaining drive period of the stop 2 after the update of the target stop position can be gradually changed to the target state. Thus, compared to the operation in FIG. 2, the change in the brightness of the captured image is suppressed, and the quality of the captured image can be further improved.

In the operation illustrated in FIG. 6, in step S23 and step S25, a moving average of an exposure value after addition obtained by adding the exposure value change amount ΔEV to the set exposure value of the immediately previous frame period and each set exposure value of several past frame periods may be calculated. This moving average value may be decided as the appropriate exposure value, and the exposure setting may be performed based on the appropriate exposure value and the target stop position.

In the example in FIG. 7, for example, in the processing P12, a moving average value of a value of (appropriate exposure value EX1+exposure value change amount ΔEV) and the set exposure value (=appropriate exposure value EX1) of each of the frame periods F1 to F4 is used as the set exposure value of the frame period F5, and the exposure setting of imaging in the frame period F5 is updated based on this set exposure value.

In addition, in the processing P13, a moving average value of a value of (set exposure value of frame period F5+exposure value change amount ΔEV) and the set exposure value of each of the frame periods F2 to F5 is used as the set exposure value of the frame period F6, and the exposure setting of imaging in the frame period F6 is updated based on this set exposure value.

In addition, in the processing P14, a moving average value of a value of (set exposure value of frame period F6+exposure value change amount ΔEV) and the set exposure value of each of the frame periods F3 to F6 is used as the set exposure value of the frame period F7, and the exposure setting of imaging in the frame period F7 is updated based on this set exposure value.

In addition, in the processing P15, a moving average value of a value of (set exposure value of frame period F7+exposure value change amount ΔEV) and the set exposure value of each of the frame periods F4 to F7 is used as the set exposure value of the frame period F8, and the exposure setting of imaging in the frame period F8 is updated based on this set exposure value.

By doing so, the update of the exposure setting corresponding to the change in the brightness of the captured image can be performed, and the quality of the captured image can be further improved.

Next, a configuration of a smartphone that is another embodiment of the imaging apparatus according to the present invention will be described.

Figure 8:
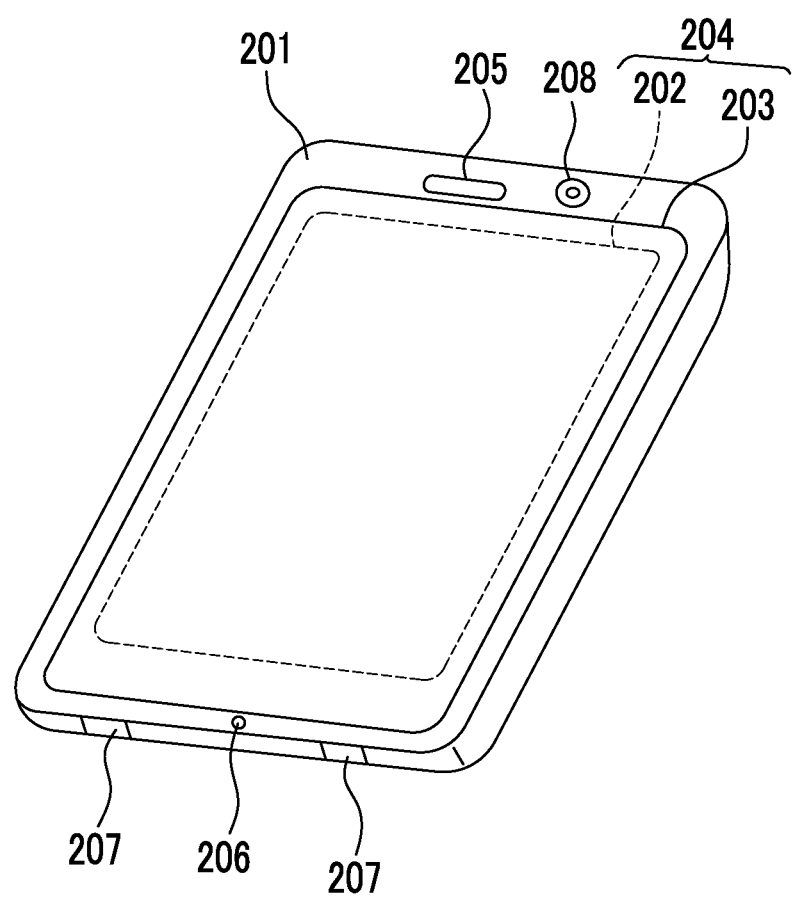
FIG. 8 illustrates an exterior of a smartphone 200.

FIG. 8 illustrates an exterior of a smartphone 200. The smartphone 200 illustrated in FIG. 8 includes a casing 201 having a flat plate shape and comprises a display and input unit 204 in which a display panel 202 as a display unit and an operation panel 203 as an input unit are integrated on one surface of the casing 201.

The casing 201 comprises a speaker 205, a microphone 206, an operation unit 207, and a camera unit 208. The configuration of the casing 201 is not limited thereto and can employ, for example, a configuration in which the display unit and the input unit are independently disposed, or a configuration that has a folded structure or a sliding mechanism.

Figure 9:
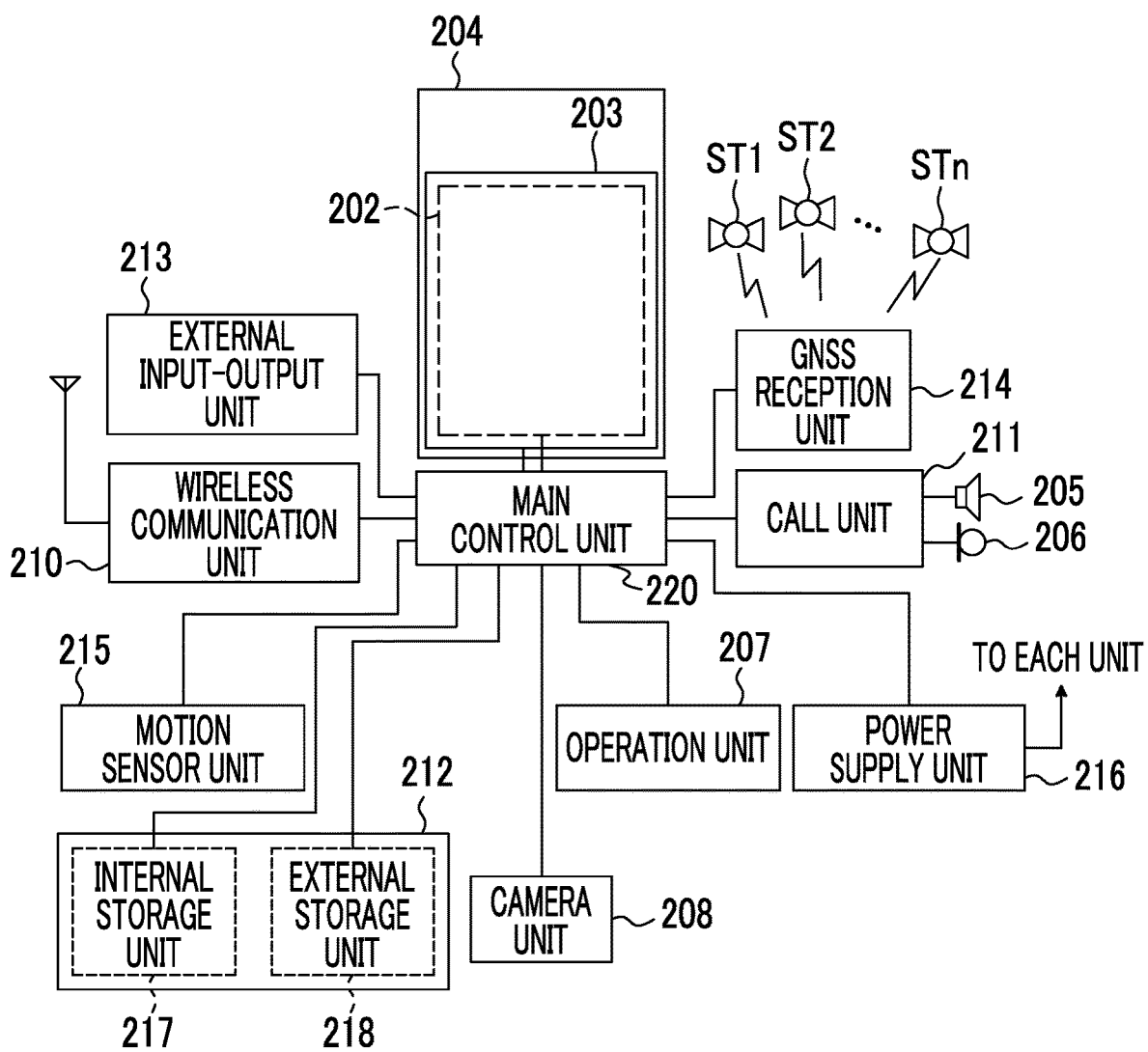
FIG. 9 is a block diagram illustrating a configuration of the smartphone 200 illustrated in FIG. 8.

FIG. 9 is a block diagram illustrating a configuration of the smartphone 200 illustrated in FIG. 8.

As illustrated in FIG. 9, a wireless communication unit 210, the display and input unit 204, a call unit 211, the operation unit 207, the camera unit 208, a storage unit 212, an external input-output unit 213, a global navigation satellite system (GNSS) reception unit 214, a motion sensor unit 215, a power supply unit 216, and a main control unit 220 are comprised as main constituents of the smartphone.

In addition, a wireless communication function of performing mobile wireless communication with a base station apparatus BS, not illustrated, through a mobile communication network NW, not illustrated, is provided as a main function of the smartphone 200.

The wireless communication unit 210 performs wireless communication with the base station apparatus BS accommodated in the mobile communication network NW in accordance with an instruction from the main control unit 220. By using the wireless communication, transmission and reception of various file data such as voice data and image data, electronic mail data, or the like and reception of web data, streaming data, or the like are performed.

The display and input unit 204 is a so-called touch panel that visually delivers information to the user by displaying images (still images and motion images), text information, or the like and detects a user operation with respect to the displayed information under control of the main control unit 220. The display and input unit 204 comprises the display panel 202 and the operation panel 203.

A liquid crystal display (LCD), an organic electro-luminescence display (OELD), or the like is used as a display device in the display panel 202.

The operation panel 203 is a device that is placed such that an image displayed on the display surface of the display panel 202 can be visually recognized, is operated by a finger of the user or a stylus, and detects one or a plurality of coordinates. In a case where the device is operated by the finger of the user or the stylus, a detection signal generated by the operation is output to the main control unit 220. Next, the main control unit 220 detects an operation position (coordinates) on the display panel 202 based on the received detection signal.

As illustrated in FIG. 9, while the display panel 202 and the operation panel 203 of the smartphone 200 illustrated as the imaging apparatus according to one embodiment of the present invention are integrated and constitute the display and input unit 204, the operation panel 203 is arranged to completely cover the display panel 202.

In a case where such arrangement is employed, the operation panel 203 may have a function of detecting the user operation even in a region outside the display panel 202. In other words, the operation panel 203 may comprise a detection region (hereinafter, referred to as a display region) for an overlapping part overlapping with the display panel 202 and a detection region (hereinafter, referred to as a non-display region) for an outer edge portion other than the overlapping part that does not overlap with the display panel 202.

A size of the display region and a size of the display panel 202 may completely match, but both sizes do not need to match. In addition, the operation panel 203 may comprise two sensitive regions of the outer edge portion and an inner part other than the outer edge portion. Furthermore, a width of the outer edge portion is appropriately designed depending on a size and the like of the casing 201.

Furthermore, as a position detection method employed in the operation panel 203, a matrix switch method, a resistive film method, a surface acoustic wave method, an infrared method, an electromagnetic induction method, an electronic capacitive method, and the like are exemplified, and any of the methods can be employed.

The call unit 211 comprises the speaker 205 or the microphone 206 and converts voice of the user input through the microphone 206 into voice data processable in the main control unit 220 and outputs the voice data to the main control unit 220, or decodes voice data received by the wireless communication unit 210 or the external input-output unit 213 and outputs the decoded voice data from the speaker 205.

In addition, as illustrated in FIG. 8, for example, the speaker 205 can be mounted on the same surface as a surface on which the display and input unit 204 is disposed, and the microphone 206 can be mounted on a side surface of the casing 201.

The operation unit 207 is a hardware key that uses a key switch or the like, and receives an instruction from the user. For example, as illustrated in FIG. 8, the operation unit 207 is a push-button type switch that is mounted on a side surface of the casing 201 of the smartphone 200 and is set to an ON state in a case where the switch is pressed by the finger or the like, and set to an OFF state by restoring force of a spring or the like in a case where the finger is released.

In the storage unit 212, a control program and control data of the main control unit 220, application software, address data in which a name, a telephone number, or the like of a communication counterpart is associated, transmitted and received electronic mail data, web data downloaded by web browsing, and downloaded contents data are stored, and streaming data or the like is temporarily stored. In addition, the storage unit 212 is configured with an internal storage unit 217 incorporated in the smartphone and an external storage unit 218 that includes a slot for an attachable and detachable external memory.

Each of the internal storage unit 217 and the external storage unit 218 constituting the storage unit 212 is implemented using a storage medium such as a memory (for example, a MicroSD (registered trademark) memory) of a flash memory type, a hard disk type, a multimedia card micro type, or a card type, a random access memory (RAM), or a read only memory (ROM).

The external input-output unit 213 is an interface with all external apparatuses connected to the smartphone 200 and is directly or indirectly connected to other external apparatuses by communication or the like (for example, Universal Serial Bus (USB), IEEE1394, Bluetooth (registered trademark), radio frequency identification (RFID), infrared communication (Infrared Data Association (IrDA) (registered trademark)), Ultra Wideband (UWB) (registered trademark), or ZigBee (registered trademark)) or through a network (for example, the Ethernet (registered trademark) or a wireless local area network (LAN)).

For example, the external apparatuses connected to the smartphone 200 include a wired/wireless headset, a wired/wireless external charger, a wired/wireless data port, a memory card and a subscriber identity module (SIM)/user identity module (UIM) card connected through a card socket, an external audio and video apparatus connected through an audio and video input/output (I/O) terminal, a wirelessly connected external audio and video apparatus, a smartphone connected in a wired/wireless manner, a personal computer connected in a wired/wireless manner, and an earphone.

The external input-output unit 213 can deliver data transferred from the external apparatuses to each constituent in the smartphone 200 or transfer data in the smartphone 200 to the external apparatuses.

The GNSS reception unit 214 receives GNSS signals transmitted from GNSS satellites ST1 to STn, executes positioning computation based on the received plurality of GNSS signals, and detects a position that includes a latitude, a longitude, and an altitude of the smartphone 200 in accordance with an instruction from the main control unit 220. In a case where positional information can be acquired from the wireless communication unit 210 or the external input-output unit 213 (for example, a wireless LAN), the GNSS reception unit 214 can detect the position using the positional information.

The motion sensor unit 215 comprises, for example, a three-axis acceleration sensor and detects a physical motion of the smartphone 200 in accordance with an instruction from the main control unit 220. By detecting the physical motion of the smartphone 200, a movement direction or an acceleration of the smartphone 200 is detected. A detection result is output to the main control unit 220.

The power supply unit 216 supplies power stored in a battery (not illustrated) to each unit of the smartphone 200 in accordance with an instruction from the main control unit 220.

The main control unit 220 comprises a microprocessor, operates in accordance with the control program and the control data stored in the storage unit 212, and manages and controls each unit of the smartphone 200. The microprocessor of the main control unit 220 has the same function as the system control unit 11. In addition, the main control unit 220 has a mobile communication control function of controlling each unit of a communication system and an application processing function for performing voice communication or data communication through the wireless communication unit 210.

The application processing function is implemented by operating the main control unit 220 in accordance with the application software stored in the storage unit 212. For example, the application processing function is an infrared communication function of performing data communication with an opposing apparatus by controlling the external input-output unit 213, an electronic mail function of transmitting and receiving electronic mails, or a web browsing function of browsing a web page.

In addition, the main control unit 220 has an image processing function such as displaying an image on the display and input unit 204 based on image data (data of a still image or a motion image) such as reception data or downloaded streaming data.

The image processing function refers to a function of causing the main control unit 220 to decode the image data, perform image processing on the decoding result, and display an image on the display and input unit 204.

Furthermore, the main control unit 220 executes a display control for the display panel 202 and an operation detection control for detecting the user operation through the operation unit 207 and the operation panel 203.

By executing the display control, the main control unit 220 displays an icon for starting the application software or a software key such as a scroll bar or displays a window for creating an electronic mail.

The scroll bar refers to a software key for receiving an instruction to move a display part of a large image or the like that does not fit in the display region of the display panel 202.

In addition, by executing the operation detection control, the main control unit 220 detects the user operation through the operation unit 207, receives an operation with respect to the icon and an input of a text string in an input field of the window through the operation panel 203, or receives a request for scrolling the display image through the scroll bar.

Furthermore, by executing the operation detection control, the main control unit 220 is provided with a touch panel control function of determining whether the operation position on the operation panel 203 is in the overlapping part (display region) overlapping with the display panel 202 or the other outer edge portion (non-display region) not overlapping with the display panel 202 and controlling the sensitive region of the operation panel 203 or a display position of the software key.

In addition, the main control unit 220 can detect a gesture operation with respect to the operation panel 203 and execute a preset function depending on the detected gesture operation.

The gesture operation is not a simple touch operation in the related art and means an operation of drawing a trajectory by the finger or the like, designating a plurality of positions at the same time, or drawing a trajectory for at least one of the plurality of positions as a combination thereof.

The camera unit 208 includes the lens device 40 and the imaging unit 50 illustrated in FIG. 1.

Captured image data generated by the camera unit 208 can be stored in the storage unit 212 or be output through the external input-output unit 213 or the wireless communication unit 210.

In the smartphone 200 illustrated in FIG. 9, the camera unit 208 is mounted on the same surface as the display and input unit 204. However, a mount position of the camera unit 208 is not limited thereto. The camera unit 208 may be mounted on a rear surface of the display and input unit 204.

In addition, the camera unit 208 can be used in various functions of the smartphone 200. For example, an image acquired by the camera unit 208 can be displayed on the display panel 202, or the image of the camera unit 208 can be used as one of operation inputs of the operation panel 203.

In addition, in a case where the GNSS reception unit 214 detects the position, the position can be detected by referring to the image from the camera unit 208. Furthermore, by referring to the image from the camera unit 208, an optical axis direction of the camera unit 208 of the smartphone 200 can be determined, or the current usage environment can be determined without using the three-axis acceleration sensor or by using the three-axis acceleration sensor together. The image from the camera unit 208 can also be used in the application software.

Besides, image data of a still image or a motion image to which the positional information acquired by the GNSS reception unit 214, voice information (may be text information acquired by performing voice to text conversion by the main control unit or the like) acquired by the microphone 206, posture information acquired by the motion sensor unit 215, or the like is added can be stored in the storage unit 212 or be output through the external input-output unit 213 or the wireless communication unit 210.

In the above description, the system control unit 11 drives the stop 2 through the stop drive unit 9. However, the system control unit 11 may be configured to directly drive the stop 2 based on the driving control signal without passing through the stop drive unit 9. In the present specification, the drive control (driving of the stop 2 based on the appropriate exposure value) performed by the system control unit 11 is defined as including both of the driving of the stop 2 by the stop drive unit 9 and the direct driving of the stop 2.

As described above, at least the following matters are disclosed in the present specification. While corresponding constituents and the like in the embodiment are shown in parentheses, the present invention is not limited thereto.

(1) A control device of an imaging apparatus that images a subject through a stop, the control device comprising a processor (system control unit 11), in which the processor is configured to derive a first exposure value (appropriate exposure value EX1) based on captured first image data (image data obtained by imaging in the frame period F1), drive the stop based on the first exposure value (first driving D1), derive a second exposure value (appropriate exposure value EX2) based on second image data (image data obtained by imaging in the frame period F4) captured during the driving of the stop based on the first exposure value, and change the driving of the stop to the driving (second driving D2) of the stop based on the second exposure value during the driving of the stop based on the first exposure value.

(2) The control device according to (1), in which the driving of the stop based on the first exposure value includes constant speed driving of driving the stop at a constant speed, and the processor is configured to change the driving of the stop to the driving of the stop based on the second exposure value during the constant speed driving.

(3) The control device according to (1) or (2), in which the driving of the stop based on the first exposure value includes decelerated driving of driving the stop while decelerating, and the processor is configured to change the driving of the stop to the driving of the stop based on the second exposure value before a transition to the decelerated driving.

(4) The control device according to any one of (1) to (3), in which the driving of the stop based on the first exposure value includes accelerated driving of driving the stop while accelerating, constant speed driving of driving the stop at a constant speed, and decelerated driving of driving the stop while decelerating, and the driving of the stop based on the second exposure value includes only the constant speed driving and the decelerated driving among the accelerated driving, the constant speed driving, and the decelerated driving.

(5) The control device according to any one of (1) to (4), in which the processor is configured to, in a case where a stop drive direction in the driving of the stop based on the first exposure value is opposite to a stop drive direction in the driving of the stop based on the second exposure value, not change to the driving of the stop based on the second exposure value.

(6) The control device according to any one of (1) to (5), in which the driving of the stop based on the first exposure value includes constant speed driving of driving the stop at a constant speed and decelerated driving of driving the stop while decelerating, and the processor is configured to, in a case where a time until a transition to the decelerated driving or a time from a transition to the constant speed driving until the transition to the decelerated driving in a period of the driving of the stop based on the first exposure value is less than a threshold value, not change to the driving of the stop based on the second exposure value.

(7) The control device according to any one of (1) to (6), in which the first image data and the second image data are a part of frames imaged at a specific frame rate, and the processor is configured to calculate an exposure value change amount (exposure value change amount ΔEV) per unit frame based on a difference between the first exposure value and the second exposure value and set an exposure value of a frame imaged after the second image data based on the number of frames from a frame of the second image data and the exposure value change amount.

(8) The control device according to (7), in which the processor is configured to set a fourth exposure value calculated as a moving average of a third exposure value that is an exposure value to be set in the frame imaged after the second image data and an exposure value set in a past frame before the frame, as the exposure value of the frame.

(9) The control device according to any one of (1) to (8), in which the processor is configured to, in a case where an operation for changing a position of the stop in the same direction as a stop drive direction in the driving of the stop based on the first exposure value is detected before acquisition of the second image data during the driving of the stop based on the first exposure value, derive the second exposure value based on image data acquired before the second image data.

(10) The control device according to any one of (1) to (9), in which the processor is configured to, in a case where an operation for changing a position of the stop in an opposite direction to a stop drive direction in the driving of the stop based on the first exposure value is detected before acquisition of the second image data during the driving of the stop based on the first exposure value, stop the derivation of the second exposure value and continue the driving of the stop based on the first exposure value to complete the driving.

(11) An imaging apparatus comprising the control device according to any one of (1) to (10).

(12) A control method of an imaging apparatus that images a subject through a stop, the control method comprising deriving a first exposure value based on captured first image data, driving the stop based on the first exposure value, deriving a second exposure value based on second image data captured during the driving of the stop based on the first exposure value, and changing the driving of the stop to the driving of the stop based on the second exposure value during the driving of the stop based on the first exposure value.

(13) A control program of an imaging apparatus that images a subject through a stop, the control program causing a processor to execute deriving a first exposure value based on captured first image data, driving the stop based on the first exposure value, deriving a second exposure value based on second image data captured during the driving of the stop based on the first exposure value, and changing the driving of the stop to the driving of the stop based on the second exposure value during the driving of the stop based on the first exposure value.

EXPLANATION OF REFERENCES

1: imaging lens
2: stop
5: imaging element
8: lens drive unit
9: stop drive unit
10: imaging element drive unit
11: system control unit
14: operation unit
15: memory control unit
16: memory
17: digital signal processing unit
20: external memory control unit
21: recording medium
22*a*: display controller
22*b*: display surface
22: display device
24: control bus
25: data bus
40: lens device
50: imaging unit
100A: main body unit
100: digital camera P1 to P6: processing
P11 to P15: processing
D1: first driving
D2: second driving
Fa: stop position
Fb, Fc: target stop position
200: smartphone
201: casing
202: display panel
203: operation panel
204: display and input unit
205: speaker
206: microphone
208: camera unit
210: wireless communication unit
211: call unit
212: storage unit
213: external input-output unit
214: GNSS reception unit
215: motion sensor unit
216: power supply unit
217: internal storage unit
218: external storage unit
220: main control unit

What is claimed is:

1. A control method of an imaging apparatus that images a subject through a stop, the control method comprising:
    deriving a first exposure value based on captured first image data;
    driving the stop based on the first exposure value;
    deriving a second exposure value based on second image data captured during the driving of the stop based on the first exposure value; and
    changing, during the driving of the stop based on the first exposure value, the driving of the stop to the driving of the stop based on the second exposure value,
    wherein the driving of the stop based on the first exposure value includes decelerated driving of driving the stop while decelerating a drive speed of the stop, and
    wherein the control method further comprises changing, before a transition to the decelerated driving, the driving of the stop to the driving of the stop based on the second exposure value.

2. The control method according to claim 1,
    wherein the driving of the stop based on the first exposure value includes constant speed driving of driving the stop at a constant speed, and
    wherein the control method further comprises changing, during the constant speed driving, the driving of the stop to the driving of the stop based on the second exposure value.

3. The control method according to claim 1,
    wherein the driving of the stop based on the first exposure value includes constant speed driving of driving the stop at a constant speed and decelerated driving of driving the stop while decelerating a drive speed of the stop, and
    wherein the control method further comprises:
        in a case where a time until a transition to the decelerated driving or a time from a transition to the constant speed driving until the transition to the decelerated driving in a period of the driving of the stop based on the first exposure value is less than a threshold value, not changing the driving of the stop to the driving of the stop based on the second exposure value.

4. The control method according to claim 1,
    wherein the first image data and the second image data are a part of frames imaged at a specific frame rate, and
    wherein the control method further comprises calculating an exposure value change amount per unit frame based on a difference between the first exposure value and the second exposure value, and setting, based on number of frames from a frame of the second image data and the exposure value change amount, an exposure value of a frame imaged after the second image data.

5. The control method according to claim 4,
    wherein the control method further comprises setting a fourth exposure value calculated as a moving average of a third exposure value that is an exposure value to be set in the frame imaged after the second image data and an exposure value set in a past frame before the frame, as the exposure value of the frame.

6. The control method according to claim 1,
    wherein the control method further comprises:
        in a case where an operation for changing a position of the stop in a same direction as a drive direction of the stop in the driving of the stop based on the first exposure value is detected before acquisition of the second image data during the driving of the stop based on the first exposure value, deriving the second exposure value based on image data acquired before the second image data.

7. The control method according to claim 1,
    wherein the control method further comprises:
        in a case where an operation for changing a position of the stop in an opposite direction to a drive direction of the stop in the driving of the stop based on the first exposure value is detected before acquisition of the second image data during the driving of the stop based on the first exposure value, stopping the deriving of the second exposure value and continuing the driving of the stop based on the first exposure value to complete the driving.

8. A non-transitory computer readable medium storing a control program of an imaging apparatus that images a subject through a stop, the control program causing a processor to execute:
    deriving a first exposure value based on captured first image data;
    driving the stop based on the first exposure value;
    deriving a second exposure value based on second image data captured during the driving of the stop based on the first exposure value; and
    changing, during the driving of the stop based on the first exposure value, the driving of the stop to the driving of the stop based on the second exposure value,
    wherein the driving of the stop based on the first exposure value includes decelerated driving of driving the stop while decelerating a drive speed of the stop, and
    wherein the control program further causes the processor to execute changing, before a transition to the decelerated driving, the driving of the stop to the driving of the stop based on the second exposure value.

9. A control method of an imaging apparatus that images a subject through a stop, the control method comprising:
    deriving a first exposure value based on captured first image data;
    driving the stop based on the first exposure value;
    deriving a second exposure value based on second image data captured during the driving of the stop based on the first exposure value; and changing, during the driving of the stop based on the first exposure value, the driving of the stop to the driving of the stop based on the second exposure value, wherein the driving of the stop based on the first exposure value includes accelerated driving of driving the stop while accelerating a drive speed of the stop, constant speed driving of driving the stop at a constant speed, and decelerated driving of driving the stop while decelerating a drive speed of the stop, and the driving of the stop based on the second exposure value includes only the constant speed driving and the decelerated driving among the accelerated driving, the constant speed driving and the decelerated driving.

10. The control method according to claim 9,
wherein the driving of the stop based on the first exposure value includes constant speed driving of driving the stop at a constant speed, and
wherein the control method further comprises changing, during the constant speed driving, the driving of the stop to the driving of the stop based on the second exposure value.

11. The control method according to claim 9,
wherein the driving of the stop based on the first exposure value includes constant speed driving of driving the stop at a constant speed and decelerated driving of driving the stop while decelerating a drive speed of the stop, and
wherein the control method further comprises:
 in a case where a time until a transition to the decelerated driving or a time from a transition to the constant speed driving until the transition to the decelerated driving in a period of the driving of the stop based on the first exposure value is less than a threshold value, not changing the driving of the stop to the driving of the stop based on the second exposure value.

12. The control method according to claim 9,
wherein the first image data and the second image data are a part of frames imaged at a specific frame rate, and
wherein the control method further comprises:
 calculating an exposure value change amount per unit frame based on a difference between the first exposure value and the second exposure value, and setting, based on number of frames from a frame of the second image data and the exposure value change amount, an exposure value of a frame imaged after the second image data.

13. The control method according to claim 12,
wherein the control method further comprises:
 setting a fourth exposure value calculated as a moving average of a third exposure value that is an exposure value to be set in the frame imaged after the second image data and an exposure value set in a past frame before the frame, as the exposure value of the frame.

14. The control method according to claim 9,
wherein the control method further comprises:
 in a case where an operation for changing a position of the stop in a same direction as a drive direction of the stop in the driving of the stop based on the first exposure value is detected before acquisition of the second image data during the driving of the stop based on the first exposure value, deriving the second exposure value based on image data acquired before the second image data.

15. The control method according to claim 9,
wherein the control method further comprises:
 in a case where an operation for changing a position of the stop in an opposite direction to a drive direction of the stop in the driving of the stop based on the first exposure value is detected before acquisition of the second image data during the driving of the stop based on the first exposure value, stopping the deriving of the second exposure value and continuing the driving of the stop based on the first exposure value to complete the driving.

16. A non-transitory computer readable medium storing a control program of an imaging apparatus that images a subject through a stop, the control program causing a processor to execute:
 deriving a first exposure value based on captured first image data;
 driving the stop based on the first exposure value;
 deriving a second exposure value based on second image data captured during the driving of the stop based on the first exposure value; and
 changing, during the driving of the stop based on the first exposure value, the driving of the stop to the driving of the stop based on the second exposure value,
 wherein the driving of the stop based on the first exposure value includes accelerated driving of driving the stop while accelerating a drive speed of the stop, constant speed driving of driving the stop at a constant speed, and decelerated driving of driving the stop while decelerating a drive speed of the stop, and
 the driving of the stop based on the second exposure value includes only the constant speed driving and the decelerated driving among the accelerated driving, the constant speed driving and the decelerated driving.

17. A control method of an imaging apparatus that images a subject through a stop, the control method comprising:
 deriving a first exposure value based on captured first image data;
 driving the stop based on the first exposure value;
 deriving a second exposure value based on second image data captured during the driving of the stop based on the first exposure value; and
 changing, during the driving of the stop based on the first exposure value, the driving of the stop to the driving of the stop based on the second exposure value,
 wherein the control method further comprises:
  in a case where a drive direction of the stop in the driving of the stop based on the first exposure value is opposite to a drive direction of the stop in the driving of the stop based on the second exposure value, not changing the driving of the stop to the driving of the stop based on the second exposure value.

18. The control method according to claim 17,
wherein the driving of the stop based on the first exposure value includes constant speed driving of driving the stop at a constant speed, and
wherein the control method further comprises changing, during the constant speed driving, the driving of the stop to the driving of the stop based on the second exposure value.

19. The control method according to claim 17,
wherein the driving of the stop based on the first exposure value includes constant speed driving of driving the stop at a constant speed and decelerated driving of driving the stop while decelerating a drive speed of the stop, and wherein the control method further comprises:
in a case where a time until a transition to the decelerated driving or a time from a transition to the constant speed driving until the transition to the decelerated driving in a period of the driving of the stop based on the first exposure value is less than a threshold value, not changing the driving of the stop to the driving of the stop based on the second exposure value.

20. The control method according to claim 17,
wherein the first image data and the second image data are a part of frames imaged at a specific frame rate, and
wherein the control method further comprises:
calculating an exposure value change amount per unit frame based on a difference between the first exposure value and the second exposure value, and setting, based on number of frames from a frame of the second image data and the exposure value change amount, an exposure value of a frame imaged after the second image data.

21. The control method according to claim 20,
wherein the control method further comprises:
setting a fourth exposure value calculated as a moving average of a third exposure value that is an exposure value to be set in the frame imaged after the second image data and an exposure value set in a past frame before the frame, as the exposure value of the frame.

22. The control method according to claim 17,
wherein the control method further comprises:
in a case where an operation for changing a position of the stop in a same direction as a drive direction of the stop in the driving of the stop based on the first exposure value is detected before acquisition of the second image data during the driving of the stop based on the first exposure value, deriving the second exposure value based on image data acquired before the second image data.

23. The control method according to claim 17,
wherein the control method further comprises:
in a case where an operation for changing a position of the stop in an opposite direction to a drive direction of the stop in the driving of the stop based on the first exposure value is detected before acquisition of the second image data during the driving of the stop based on the first exposure value, stopping the deriving of the second exposure value and continuing the driving of the stop based on the first exposure value to complete the driving.

24. A non-transitory computer readable medium storing a control program of an imaging apparatus that images a subject through a stop, the control program causing a processor to execute:
deriving a first exposure value based on captured first image data;
driving the stop based on the first exposure value;
deriving a second exposure value based on second image data captured during the driving of the stop based on the first exposure value; and
changing, during the driving of the stop based on the first exposure value, the driving of the stop to the driving of the stop based on the second exposure value,
wherein the control program further causes the processor to execute:
in a case where a drive direction of the stop in the driving of the stop based on the first exposure value is opposite to a drive direction of the stop in the driving of the stop based on the second exposure value, not changing the driving of the stop to the driving of the stop based on the second exposure value.

* * * * *